United States Patent [19]
Weaver

[11] 4,330,233
[45] May 18, 1982

[54] FLOW CONTROL APPARATUS FOR SILAGE UNLOADER

[76] Inventor: Richard L. Weaver, R.D. 4, Myerstown, Pa. 17067

[21] Appl. No.: 177,493

[22] Filed: Aug. 12, 1980

[51] Int. Cl.³ .............................................. B65G 65/46
[52] U.S. Cl. .................... 414/310; 222/232; 222/555
[58] Field of Search .............................. 414/306–312; 222/240, 232, 548, 555

[56] References Cited

U.S. PATENT DOCUMENTS

| | | | |
|---|---|---|---|
| 3,132,769 | 5/1964 | Zehrbach | 222/548 X |
| 3,493,130 | 2/1970 | Laidig | 414/311 |
| 3,648,860 | 3/1972 | Wennberg | 414/310 |

Primary Examiner—Robert G. Sheridan
Attorney, Agent, or Firm—Paul & Paul

[57] ABSTRACT

In the silo unloader art, wherein a bottom unloader is used, and specifically an unloader of the generally central discharge type, wherein an auger delivers silage to the central zone of a silo, as the auger rotates on its own axis, and sweeps across the bottom of a silo, to a passageway through the floor of the silo, generally at the center of the silo, an openable closure is provided for the silo, for controlling the flow of silage through the passageways. Particularly, when the silo is closed down for the night, and when the silage is of the dry, granular, readily flowable type, the openable closure allows the passageways to be closed so as not to allow silage to build up and become compacted in the passageway area beneath the silo floor and around the silo exit auger.

13 Claims, 5 Drawing Figures

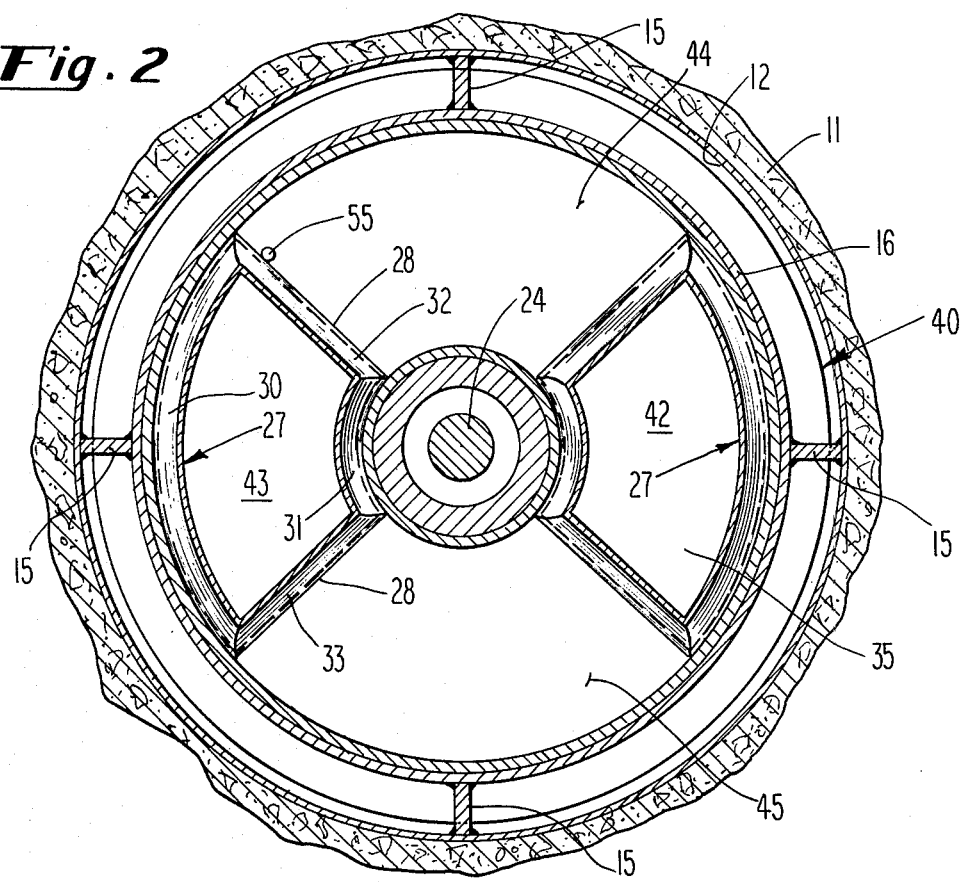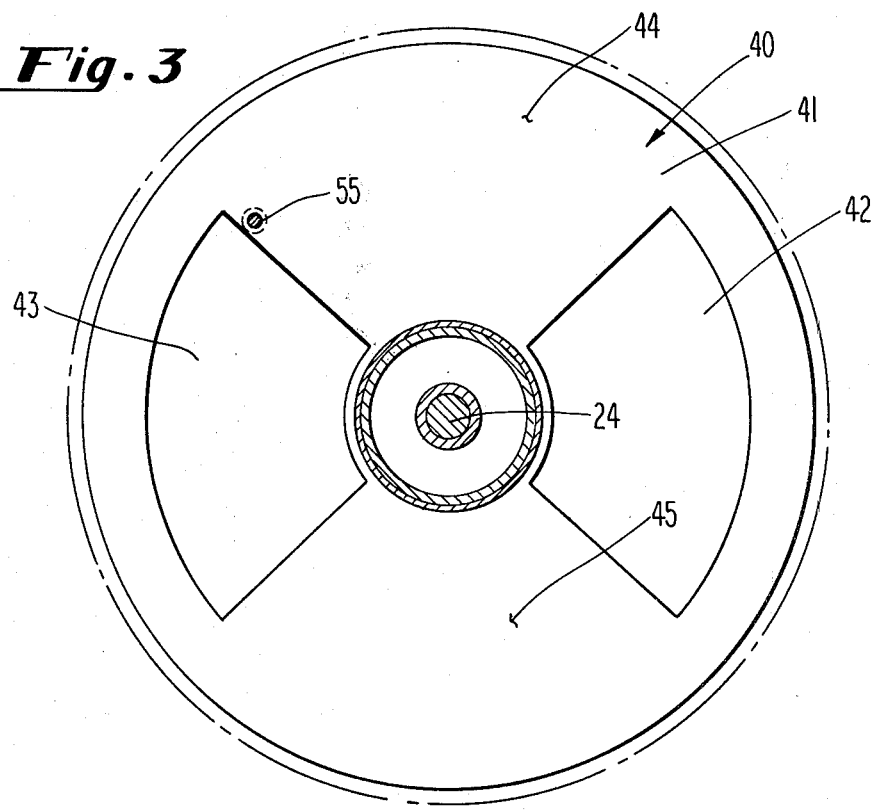

FLOW CONTROL APPARATUS FOR SILAGE UNLOADER

BACKGROUND OF THE INVENTION

This invention relates to the art of silo unloaders, particularly bottom unloaders. In the art of silo bottom unloaders, augers are utilized, in rotation about their own axis, and also in sweeping motion across the floor of a silo, to deliver silage toward a generally central opening, discharge chute, or passageway member at about the center thereof. An example of such an auger having central discharge for discharging silage from the bottom central portion of a silo is disclosed in my earlier U.S. Pat. No. 4,095,703. Another example of a bottom silo unloader of this type is set forth in my U.S. Pat. No. 4,057,151, wherein the radial inner end of the auger is carried by a radially moveable central support plate that is separated from the silo floor by silage discharge openings. Often, such silos employ an additional discharge auger or other lower conveyor, for conveying silage that has been discharged through the central passageway, upwardly and outwardly to the exterior of the silo, and is disclosed in my U.S. Pat. No. 4,057,152. Other types of conveyors are as disclosed in my U.S. Pat. No. 4,057,153, and these convey the silage that has been discharged through the bottom central opening in the silo floor, upwardly and out to the exterior of the silo.

Such devices as have been disclosed in my prior inventions, function very well, and particularly well, when the silage is damp and not readily flowable.

However, when silage is of a readily flowable type, such as dried corn kernels, it is possible that jamming of the passageway beneath the silo floor may occur during an overnight condition of non-use. That is, when the unloader is not being used, as during overnight, the dry, readily flowable silage may drop down through the passageway between the radial inward support for the auger and the silo floor, become packed around the drive train for the auger rotation, and become compacted around the conveyor that is disposed beneath the silo floor for the purposes of conveying discharged silage upwardly out of the silo. Such compaction can occur, whether the lower conveyor is of the belt, or auger types.

It is this problem to which the present invention is addressed.

SUMMARY OF THE INVENTION

The present invention is addressed to providing a flow control apparatus, wheel, or disc, that can be used to cover the silo central floor discharge passages, when the silo is not in use, and which may readily be actuated from outside the silo, to partially open, or open the flow control apparatus, as desired, a predetermined amount, or completely, by angular movement of the flow control wheel or disc in such a way such that holes or other perforate portions thereof will be brought in registry or alignment with passageway openings in the silo central discharge, when flow is desired, but whereby imperforate portions may be used to shut off flow through the passageways, when flow is not desired, acting as a closure for such passage openings. Also, there is provided for engagement of the closure, automatically, upon sweeping motion of the auger, such that, as the auger is operating to cause flow of silage into the passageway, the flow control wheel or closure will automatically become opened upon rotation of the auger support at the radial inner end of the auger.

Additionally, the passage openings for silage through the floor of the silo are of a greater dimension at the lower end, than at their upper end, to provide a passive manner of encouraging silage discharge, upon opening of the closure.

Accordingly, it is an object of the present invention to provide for a closure of the passageway from a silo through the floor thereof.

It is another object of this invention to accomplish the above object, wherein said closure is both fully and partially openable.

It is another object of this invention to accomplish the above object, wherein said opening may be accomplished from a location remote from the silo passageway.

It is a further object of this invention to provide for optional alignment of openings in a closure, with the silage passageway, as desired.

It is a further object of this invention to provide wall construction for silage central opening passageways, that facilitate passive discharge of silage that may happen to be disposed therein.

Other objects and advantages of the present invention will be readily apparent to those skilled in the art from the following brief descriptions of the drawing figures, detailed descriptions of the preferred embodiments, and the appended claims.

BRIEF DESCRIPTIONS OF THE DRAWING FIGURES

FIG. 2 is a horizontal sectional view, taken generally along the line II—II of FIG. 1, and wherein the closure member or flow control wheel is shown with its imperforate portion closing off the openings at the bottom of the passages through the passage member.

FIG. 3 is a horizontal sectional view, taken generally along the line III—III of FIG. 1, and wherein the flow control wheel is illustrated substantially in plan view.

DETAILED DESCRIPTION OF THE PREFERRED EMBODIMENTS

Figure 1:
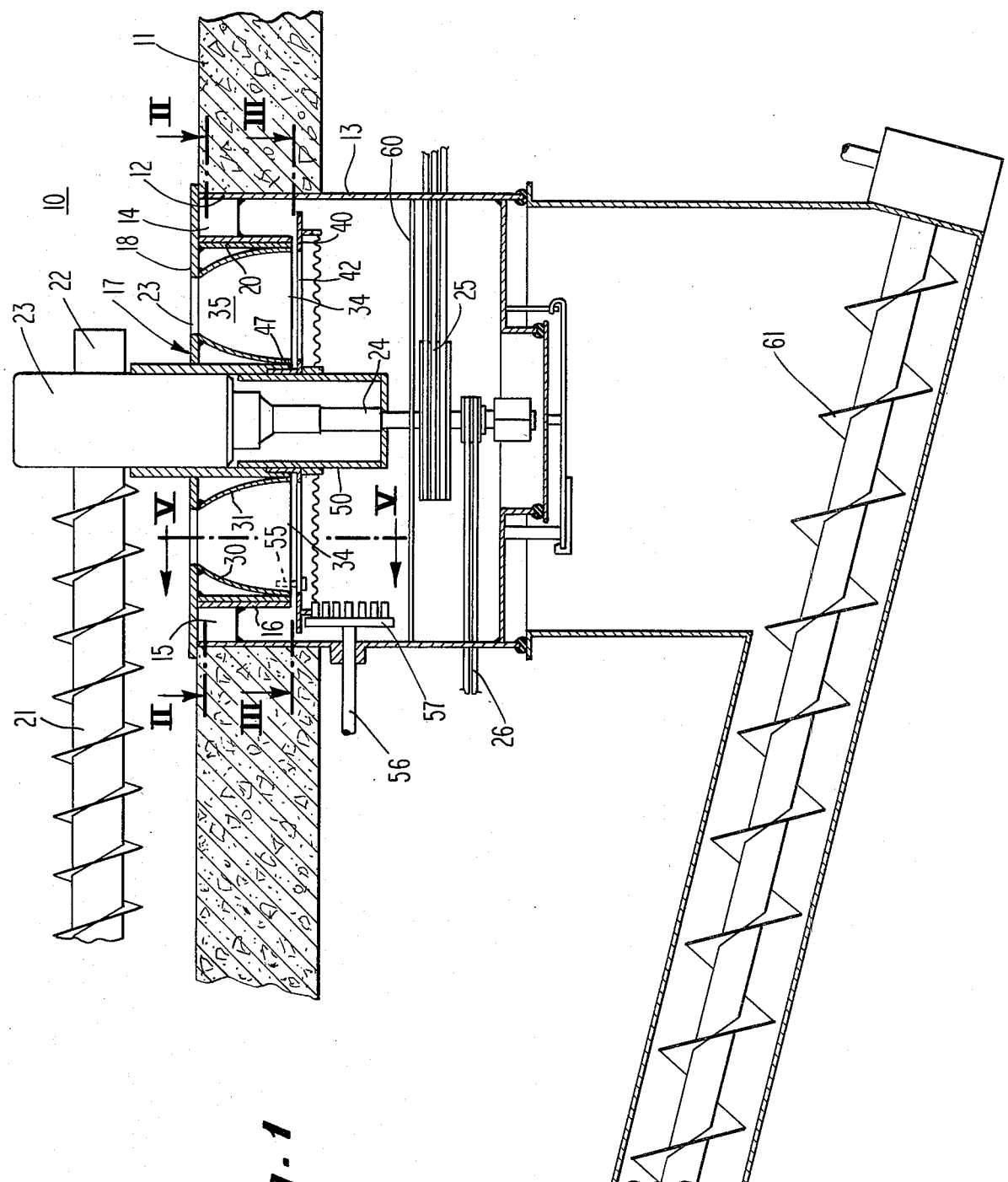
FIG. 1 is a vertical sectional view, taken through the apparatus of this invention, particularly through the passage apparatus or chute, showing the openings for delivery of silage through the center of the floor of a silo, to an exit auger beneath that floor.
Figure 4:
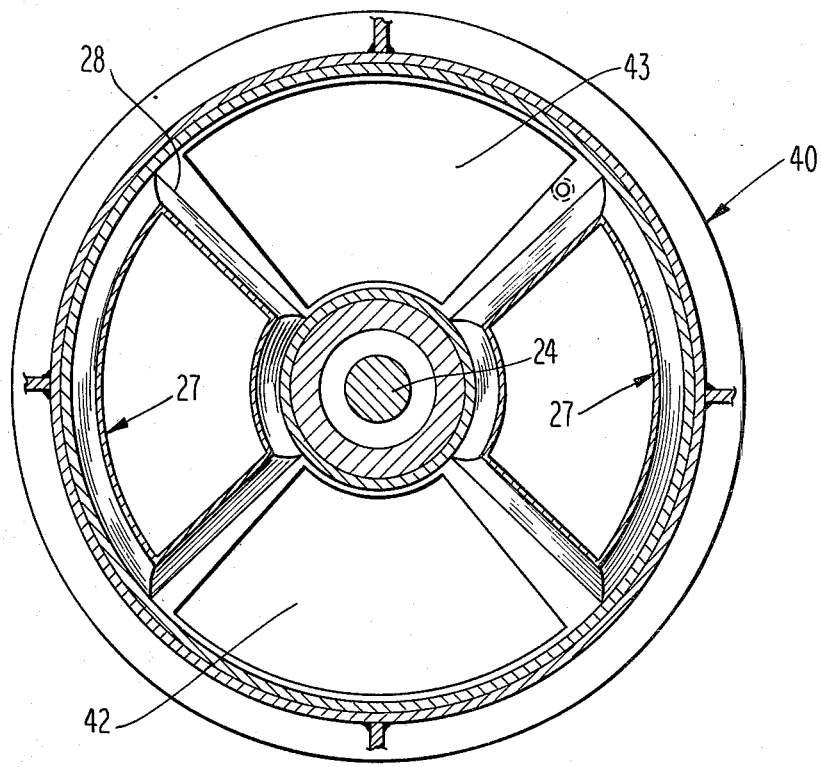
FIG. 4 is a view similar to that of FIG. 2, but wherein the flow control wheel is shown with its imperforate portions moved substantially 90 degrees, to leave its perforate portions aligned with the openings or passageways in the passage member.

Referring now to the drawings in detail, reference is first made to FIG. 1, wherein a silo generally designated by the numeral 10 is indicated as having a silo bottom floor 11, of concrete or like construction, with a central opening 12 therein, at the center thereof, generally circular in configuration.

A generally cylindrical sheetmetal passage duct 13 is disposed therein, fixedly secured to the concrete 11. Suitably connected to the duct 13 are a plurality of supporting webs 14, 15, that in turn carry a steel sleeve or the like 16 welded thereto. An auger inner support is generally designated by the numeral 17, and comprises a top plate 18 and a depending sleeve 20, with the sleeve 20 being generally welded to the plate 18, and being slidably disposed inside the sleeve 16, concentric therewith, but disposed for angular rotation therein, along with the central plate 18 that is in welded connection with the sleeve 20, and that likewise is disposed for angular rotation in a generally horizontal plane, as the auger 21 sweeps across the floor 11 of the silo. It will be noted that the radial inner end 22 of the auger 21 is supportingly carried by the support 17, and moves therewith, and that the auger 21 is provided with a drive train for rotation about its own axis, through gear box 23, drive shaft 24, and drive pulley. The belt arrangement 26 may likewise, if desired, provide the sweep for the auger 21 across the silo floor. It will be understood that the drive 25 and 26, may be interchanged, if desired, and in fact, the sweep drive for the auger 21 may be provided from another source, if desired. Accordingly, as the auger 21 sweeps across the floor, the plate 18 likewise angularly rotates therewith, as do the passage means or openings 27.

Figure 5:
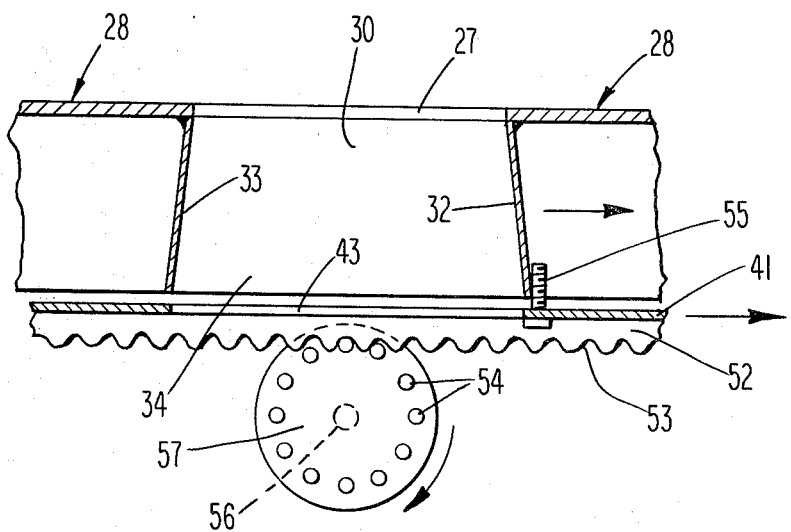
FIG. 5 is a transverse sectional view, taken generally along the line V—V of FIG. 1, wherein the passage member is shown with one of its walls in engagement with the engagement bolt carried by the closure member, such that its perforate portion is aligned with the opening in the passage member, to facilitate discharge completely therethrough of silage, when the auger is rotating.

The passage means or openings 27 in the passage member 17 are smaller at their upper ends than at their lower ends, as is apparent from FIGS. 1, 2, 4 and 5, and are generally constructed as ring-like member segments 27, separated by support segment members 28 that, comprise housings of a cross-sectional configuration best illustrated in FIG. 5.

The openings 27 are therefore each defined by a first arcuately curve sheetmetal member 30 of compound concavity, as shown in FIGS. 1 and 2, and an inner compound-convex sheet metal portion 31, which sheetmetal portions are welded to the plate 17 and other structural members, as shown, and are connected by generally radially disposed, but sloped plates 32 and 33, all of which are configured so as to define a gradually increasing cross-sectional configuration for the passage means or openings 35, as such openings go from their upper ends at 27 to their lower ends at 34.

Just below the passageway member 17, is disposed the flow control apparatus or openable closure member 40.

At this point, reference is made to FIG. 3 which illustrates the member 40 as comprising a plate or a wheel 41, that generally is constructed as a metal disc, with two perforate portions, preferably being constructed as segment openings 42 and 43, each of slightly less than 90 degrees when viewed in plan as in FIG. 3. Accordingly, the openings or perforate portions 42, 43 are oppositely disposed across the axis of angular rotation of the plate 40, separated by sheetmetal imperforate portions 44 and 45, as illustrated.

The closure 40 has an upstanding flange 47, connected to the plate 41, and the flange 47 provides on its radial interior surface 48, a sliding surface for sliding of the plate 40 therewith, about the periphery 50 of a sleeve member. Accordingly, the closure 40 is rotationally movable in a horizontal plane as illustrated in FIG. 1, relative to the passage member 17.

The manner in which such movement is effected is by means of a rack 52 having gear-like teeth 53 therein, cylindrically disposed as illustrated in FIG. 1, beneath the plate 41, and slightly inward of the periphery thereof, with the depending teeth 53, being adapted for engagement by pins 54 of a pin gear 57 that in turn is mounted on a shaft 56 that in turn is rotational by exterior means, such as a crank, outside the silo, not particularly shown, connected to shaft 56 as by a one-way clutch. By turning the crank, the shaft 56 will cause the pin gear 57, to have its pins 54 engage in the gear-like teeth 53 of the rack 52, and consequently cause the closure 40 to be moved to or from an open or closed, or even partially open or closed position, as desired, in order to control the flow of silage through the passage openings 35. It will be apparent that while drawings illustrate two such openings 35, any other number could, if desired, be provided, preferably with a similar number of closure portions 44 or 45, as would best effectuate the purposes of this invention.

An engagement member 55, in the form of a bolt fixedly carried by plate 40, and projecting upwardly therefrom as illustrated in FIG. 1, enables the positive movement of the closure member 40, into an open position, upon sweeping motion of the auger 21. Therefore, upon sweeping motion of the auger, drawing silage into the passage openings 35, the movement of the passage member 17 will cause engagement of the pin 55, against the surface 32, as shown in FIG. 2, such that the closure would always be in a position where its perforate portions or openings 42, 43, will always be disposed beneath the open ends 34 of the passage portions, when silage is being discharged into the passage portion 35.

Accordingly, it will be seen that the ends of the invention are readily satisfied, such that silage cannot only be metered by the flow control wheel, but that, in an overnight situation, silage will be compact around the housing 60 for the drives, nor around the exit auger 61.

It will thus be apparent that the various objects of this invention are met, and that various modifications may be made in the details of the apparatus, all within the spirit and scope of the invention, as defined in the appended claims.

What is claimed is:

1. In silage unloader apparatus of the bottom unloader type, wherein a generally radially disposed auger means is provided for rotation on its own axis and for arcuate sweeping motion for delivering silage toward a generally centrally located rotatable discharge passageway member, wherein the discharge passageway member is generally vertically disposed and is provided with permanently open generally vertically disposed passage means, the improvement comprising a closeable opening member disposed generally vertically adjacent said passage means, said opening member having both perforate and imperforate portions and including means mounting said opening member for movement relative to said passage means for selective positioning of said perforate portion(s) or imperforate portion(s) relative to said passage means for respective corresponding opening and closing of said passage means.

2. The apparatus of claim 1, wherein said opening member and said passageway member are generally concentrically disposed, with said opening member comprising a plate-like member disposed beneath said passage means of said passageway member, angularly shiftable in a generally horizontal plane for opening and closing said passage means.

3. The apparatus of claim 2, wherein said opening member is provided with adjustment means for selectively adjusting the position of perforate portion(s) of said opening members relative to said passage means.

4. The apparatus of claim 2, wherein said passageway member is movably mounted for rotation in a generally horizontal plane with the sweeping motion of the auger means.

5. The apparatus of claim 4, including engagement means carried by one of said opening member and said discharge passageway member for engagement by the other, for angular shiftable movement of said opening member as dictated by the angular shiftable movement of said passageway member upon sweeping motion of said auger means, with said opening member positioned with it perforate portion(s) in substantial vertical alignment with said passage means.

6. The apparatus of claim 5, wherein said opening member is provided with adjustment means for selectively adjusting the position of perforate portion(s) of said opening members relative to said passage means.

7. The apparatus of claim 6, wherein said passage means are of given vertical depth, and wherein the passage means is of varying cross-section from a smaller opening size at the upper end of said passage means to a large opening size at the lower end of said passage means, and with said varying cross-section comprising passive means facilitating ready release of accumulated silage therefrom, upon opening of said passage means.

8. The apparatus of claim 7, wherein said opening member is provided with adjustment means for selectively adjusting the position of perforate portion(s) of said opening members relative to said passage means, wherein adjustment means comprises a generally circularly arranged rack carried by said plate-like member near the periphery thereof, and a gear member in meshed engagement with said rack, including means for rotatably positioning said gear member for correspondingly positioning said rack and thereby said plate-like member.

9. In silage unloader apparatus of the bottom unloader type, wherein a generally radially disposed auger means is provided for rotation on its own axis and for arcuate sweeping motion for delivering silage toward a generally centrally located discharge passageway member, wherein the discharge passageway member is generally vertically disposed and is provided with permanently open generally vertically disposed passage means, the improvement comprising a closeable opening member disposed generally vertically adjacent said passage means, said opening member having both perforate and imperforate portions and including means mounting said opening member for movement relative to said passage means for selective positioning of said perforate portion(s) or imperforate portion(s) relative to said passage means for respective corresponding opening and closing of said passage means, said passage means being of given vertical depth and of varying cross-section from a smaller opening size at the upper end of said passage means to a large opening size at the lower end of said passage means, said opening member being disposed beneath said passage means and with said varying cross-section comprising passage means facilitating ready release of accumulated silage therefrom, upon opening of said passage means.

10. The apparatus of claim 9, wherein said passage means in horizontal section comprise a pair of ring-segment-shaped openings.

11. The apparatus of claim 9, wherein the varying cross-section of said passage means is comprised in part by arcuate shaped walls.

12. The apparatus of claim 9 wherein said opening member and said passageway member are generally concentrically disposed, with said opening member comprising a plate-like member disposed beneath said passage means of said passageway member, angularly shiftable in a generally horizontal plane for opening and closing said passage means, said opening member being provided with adjustment means for selectively adjusting the position of perforate portion(s) of said opening members relative to said passage means, said adjustment means comprising a generally circularly arranged rack carried by said plate-like member near the periphery thereof, and a gear member in meshed engagement with said rack, including means for rotatably positioning said gear member for correspondingly positioning said rack and thereby said plate-like member.

13. The apparatus of claim 12, wherein said means for rotatably positioning comprise a pin gear having a shaft disposed remote therefrom for rotation of said shaft and thereby said pin gear.

* * * * *